United States Patent
Nakamura

(10) Patent No.: US 11,195,069 B2
(45) Date of Patent: Dec. 7, 2021

(54) INFORMATION PROCESSING APPARATUS CONFIGURED TO EXTRACT OBJECT FROM IMAGE DATA AND GENERATE PRINTING DATA REPRESENTING IMAGE INCLUDING OBJECT, METHOD OF CONTROLLING THE SAME, AND NON-TRANSITORY COMPUTER-READABLE RECORDING MEDIUM THEREFOR

(71) Applicant: Brother Kogyo Kabushiki Kaisha, Nagoya (JP)

(72) Inventor: Kenichi Nakamura, Anjo (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/521,143

(22) Filed: Jul. 24, 2019

(65) Prior Publication Data
US 2020/0042842 A1 Feb. 6, 2020

(30) Foreign Application Priority Data
Jul. 31, 2018 (JP) .............................. JP2018-143155

(51) Int. Cl.
*G06F 3/12* (2006.01)
*G06K 15/02* (2006.01)

(52) U.S. Cl.
CPC ....... *G06K 15/1825* (2013.01); *G06K 15/024* (2013.01); *G06K 15/1822* (2013.01); *G06K 2215/0097* (2013.01)

(58) Field of Classification Search
None
See application file for complete search history.

(56) References Cited

U.S. PATENT DOCUMENTS 5,978,519 A * 11/1999 Bollman .................. G06T 7/70
382/270
7,353,987 B2 * 4/2008 Matsuura ................. G06K 1/14
235/375

(Continued)

OTHER PUBLICATIONS

Dec. 16, 2019—(EP) Extended Search Report—App 19188153.1.
Feb. 22, 2021—(EP) Examination Report—App 19188153.1.
Apr. 8, 2020—U.S. Notice of Allowance—U.S. Appl. No. 16/523,190.

*Primary Examiner* — Paul F Payer
(74) *Attorney, Agent, or Firm* — Banner & Witcoff, Ltd.

(57) ABSTRACT

A non-transitory computer-readable recording medium for an information processing apparatus contains instructions which cause, when executed by a controller, the information processing apparatus to perform identifying a sheet size of a sheet which is used for printing based on identifying data, the identifying data being received through the input interface and identifying the sheet size based on the received identifying data, receiving image data which is output by the application, when the received image data represents an image in which a first object is arranged, when the size of the image is a first size, and when the identified sheet size is a second size, extracting object image data representing the first object from the image data received in the receiving process, generating printing data, and outputting the generated printing data to be transmitted to the printer through the communication interface.

10 Claims, 10 Drawing Sheets

(56) References Cited

U.S. PATENT DOCUMENTS

| | | |
|---|---|---|
| 8,018,618 B2 * | 9/2011 | Ishibashi ............... G06F 40/103 |
| | | 358/1.18 |
| 9,392,127 B1 | 7/2016 | AnanthaNarayanan |
| 10,750,038 B2 * | 8/2020 | Nakamura .............. G06F 3/125 |
| 2007/0158425 A1 | 7/2007 | Matsuura |
| 2015/0049354 A1 | 2/2015 | Kawano |
| 2015/0110398 A1 | 4/2015 | Totsuka et al. |
| 2016/0219187 A1 | 7/2016 | Harada et al. |

\* cited by examiner

INFORMATION PROCESSING APPARATUS CONFIGURED TO EXTRACT OBJECT FROM IMAGE DATA AND GENERATE PRINTING DATA REPRESENTING IMAGE INCLUDING OBJECT, METHOD OF CONTROLLING THE SAME, AND NON-TRANSITORY COMPUTER-READABLE RECORDING MEDIUM THEREFOR

CROSS-REFERENCE TO RELATED APPLICATIONS

This application claims priority under 35 U.S.C. § 119 from Japanese Patent Application No. 2018-143155 filed on Jul. 31, 2018. The entire subject matter of the application is incorporated herein by reference.

BACKGROUND

Technical Field

The present disclosures relate to a non-transitory computer-readable medium storing instructions realizing a printer driver with which an object such as a barcode can be printed on a printing sheet. The present disclosures also relate to an information processing apparatus employing the printer driver.

Related Art

There has been known conventional art for printing objects such as barcodes on a label sheet on which a plurality of labels (e.g. item labels) are arranged in a matrix. An example of providing image data representing a plurality of arranged barcodes is known from the Internet site indicated below, which is known as FULFILLMENT by AMAZON®.
<https://images-na.ssl-images-amazon.com/images/G/09/rainier/fba-help/quickguide/3_ItemLabel.pdf>

SUMMARY

According to the conventional art mentioned above, it is possible to print objects on the label sheet. Typically, from the image data the printer driver received, object image data which is an image including objects is extracted, and the image represented by the extracted object image data is formed on the item label. Therefore, it is desired that the object image data is appropriately extracted from the image data the printer driver received.

According to aspects of the present disclosures, there is provided a non-transitory computer-readable recording medium for an information processing apparatus having a communication interface, an input interface and a controller, the controller being configured to read an application which is configured to output image data, the recording medium storing computer-readable printing data generating instructions. The instructions cause, when executed by the controller, the information processing apparatus to perform an identifying process of identifying a sheet size of a sheet which is used for printing based on identifying data, the identifying data being received, through the input interface, in the identifying process, the identifying data indicating the sheet size to be used for printing, a receiving process of receiving image data which is output by the application, when the image data received in the receiving process represents an image in which a first object is arranged, when the size of the image is a first size, and when the sheet size identified in the identifying process is a second size which is different from the first size, an extracting process of extracting object image data representing the first object from the image data received in the receiving process, a generating process of generating printing data causing a printer, which is connected with the information processing apparatus through the communication interface, to print an image in which a first object represented by the object image data extracted in the extracting process is arranged on the sheet having the second size, and an outputting process of outputting the printing data generated in the generating process, the printing data being to be transmitted to the printer through the communication interface.

According to aspects of the present disclosures, there is provided an information processing apparatus having a communication interface, an input interface, and a controller. The controller is configured to read an application which is configured to output image data. Further, the controller controls the information processing apparatus to perform an identifying process of identifying a sheet size of a sheet which is used for printing based on identifying data, the identifying data being received, through the input interface, in the identifying process, the identifying data indicating the sheet size to be used for printing, a receiving process of receiving image data which is output by the application, when the image data received in the receiving process represents an image in which a first object is arranged, when the size of the image is a first size, and when the sheet size identified in the identifying process is a second size which is different from the first size, an extracting process of extracting object image data representing the first object from the image data received in the receiving process, a generating process of generating printing data causing a printer, which is connected with the information processing apparatus through the communication interface, to print an image in which a first object represented by the object image data extracted in the extracting process is arranged on the sheet having the second size, and an outputting process of outputting the printing data generated in the generating process, the printing data being to be transmitted to the printer through the communication interface.

According s to aspects of the present disclosures, there is provided s method of controlling an information processing apparatus having a communication interface, an input interface, an application being installed in the information processing apparatus, the application being configured to output image data. The method includes identifying a sheet size of a sheet which is used for printing based on identifying data, the identifying data being received through the input interface identifying the sheet size to be used for printing, receiving image data which is output by the application, when the received image data represents an image in which a first object is arranged, when the size of the image is a first size, and when the identified sheet size is a second size which is different from the first size, extracting object image data representing the first object from the image data as received, generating printing data causing a printer, which is connected with the information processing apparatus through the communication interface, to print an image in which a first object represented by the object image data as extracted is arranged on the sheet having the second size, and outputting the generated printing data which is to be transmitted to the printer through the communication interface.

By the printer driver, object image data representing the first object can be automatically extracted from the image data the printer driver receives. That is, from the image data the printer driver receives, the object image data can be extracted appropriately.

BRIEF DESCRIPTION OF THE ACCOMPANYING DRAWINGS

DETAILED DESCRIPTION OF THE ILLUSTRATIVE EMBODIMENT

Figure 1:
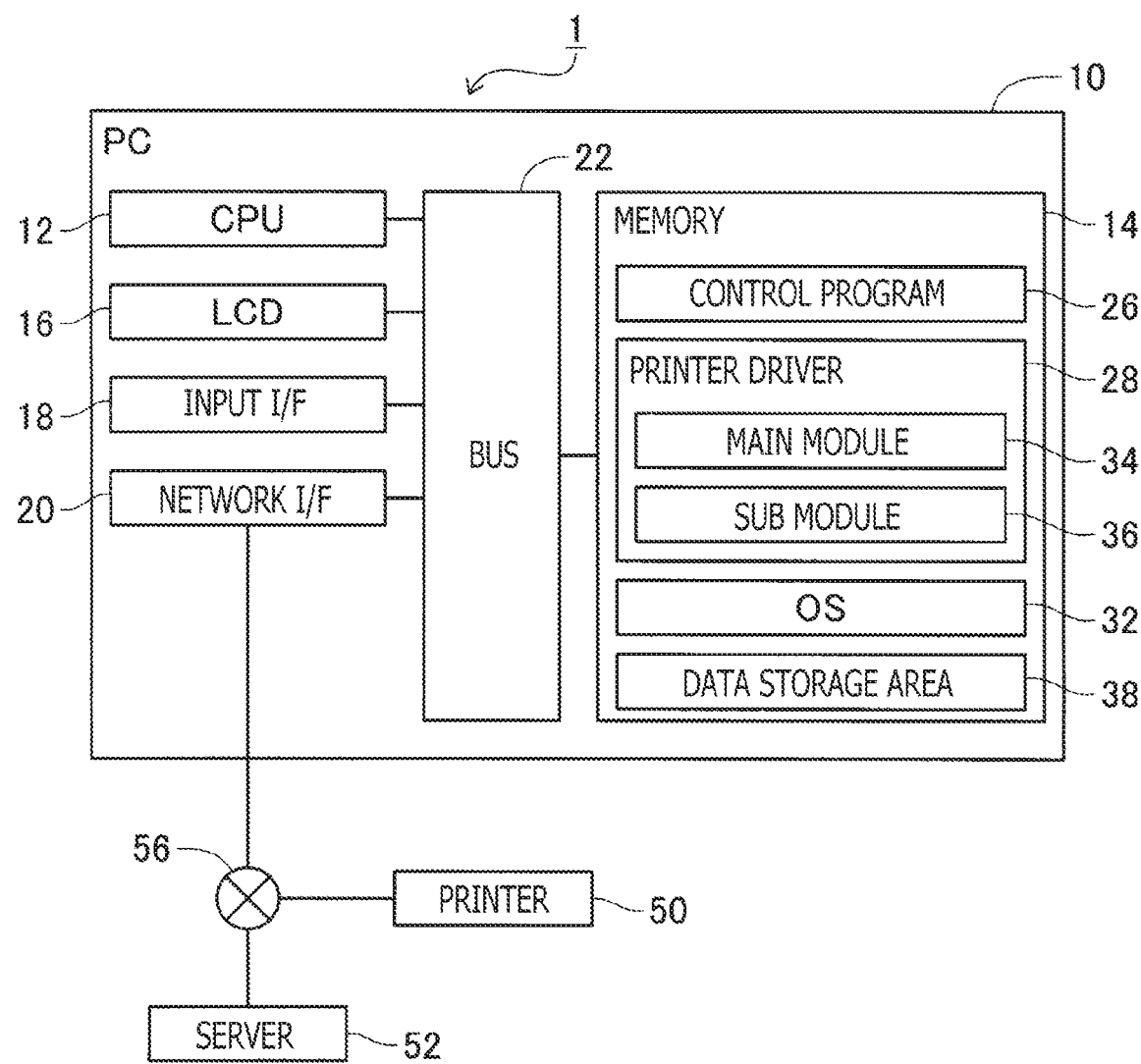
FIG. 1 is a block diagram of a communication system according to an illustrative embodiment of the present disclosures.

FIG. 1 shows a communication system 1 according to an illustrative embodiment of the present disclosures. The communication system 1 includes a PC (which is an example of an information processing apparatus) 10, a printer (which is an example of a printer) 50 and a server 52.

The PC 10 mainly includes a CPU (which is an example of a controller) 12, a memory 14, an LCD (which is an example of a displaying interface) 16, an input OF (which is an example of an input/output I/F) 18 and a network OF (which is a communication interface) 20, which are communicatably interconnected through a bus 22.

The PC 10 is configured to communicate with a printer 50 through the network OF 20 and a network 56. As a communication method, a wired LAN, a USB, Wi-Fi®, Bluetooth® and the like can be employed. The printer 50 is a device configured to print images on label sheets. The printer 50 exchanges, with the PC 10, various pieces of information and instruction signals. The printer 50 performs a printing operation to print desired texts and objects (e.g., images) on the label sheets under control of the PC 10.

According to the embodiment, the printer 50 is dedicated to perform a label printing and is not configured to print images on cut sheets such as A4 sheets, B4 sheets or the like. Further, the network OF 20 is connected to a server 52 through the network 56. According to the above configuration, the PC 10 exchanges information with the server 52 through the network 56.

The CPU 12 performs the processes in accordance with a control program (which is an example of an application) 26 stored in the memory 14, the printer driver 28 and the OS 32. The control program 26 is a program for browsing and printing files having particular formats (e.g., PDF files). An example of the control program 26 is Adobe Reader®. The printer driver 28 is a device driver for the printer 50, and controls the printer 50 to perform various operations. It is noted that the printer driver 28 includes a main module 34 and a sub module 36. The main module 34 performs creation of the printing image data (described in detail later), and the sub module 36 performs an image extraction process and the like. The OS 32 is a program providing basic functions utilized by the control program 26 and the printer driver 28. It is noted that the CPU 12 executing the printer driver 28 and the like will be referred to simply by the name of the programs. For example, an expression "the printer driver 28 performs . . . " may be used to mean "the CPU 12 executing the printer driver 28 performs . . . ".

The memory 14 includes a data storage area 38. The data storage area 38 is an area to store data necessary for executing the printer driver 28. It is noted that the memory 14 is configured by combining a RAM, a ROM, a flash memory, an HDD, a buffer provided to the CPU 12 and the like.

It is noted that the memory 14 may be a computer-readable storage medium. The computer-readable storage medium is a non-transitory medium. The non-transitory medium includes, in addition to the computer-readable storage medium above, a recording medium such as a CD-ROM, a DVD-ROM and the like. It is also noted that the non-transitory medium is a tangible medium. In contrast, an electrical signal carrying programs downloaded from a server on the Internet or the like is a computer-readable signal medium, which is one type of a computer-readable medium, is not included in the non-transitory computer-readable storage medium.

The LCD 16 is configured to display various pieces of information regarding the PC 10. It is noted that the display need not be limited to the LCD, but other types of displays (e.g., an organic EL display) may be employed. The input I/F 18 is an interface through which user operations are input. The input I/F 18 includes keyboard, a mouse and the like. The input I/F 18 may be a touch panel integrally provided onto a displaying surface of the LCD 16.

In the specification, processes of the CPU 12 according to the instructions described in programs will be mainly described. That is, processes to "judge," "extract," "select," "calculate," "determine," "identify," "specify," "obtain," "receive," "control" and the like are those performed by the CPU 12. It is noted that the processes performed by the CPU 12 may include control of hardware through the OS 30. It is also noted that the term "obtain" is used to mean a concept which does not necessarily include a concept of requesting. That is, a process of the CPU 12 to receive data without requesting therefor is also included in a concept that "the CPU 12 obtains data."

The communication system 1 is configured to perform printing of item labels which are used for a service provided by a service providing company. FULFILMENT by AMAZON® is an example of such a service.

Concretely, the server 52 is run by a service providing company. The PC 10 operated by the user accesses the server 52 and obtains image data of an image to be printed on the sheet having a size of a label (hereinafter, referred to as a label sheet). Examples of the image to be printed on the label sheet include, an item label image 70 shown in FIG. 2 (which is an example of a first object) and a delivery label image 80 shown in FIG. 3 (which is another example of the first object).

The item label image 70 is used for identifying the items (which is an example of a second usage). As shown in FIG.

2, the item label image 70 contains a barcode 72 which is a code indicating information intrinsic to the item, a name of the item (hereinafter, referred to as an item name) 74 and a condition of the item (hereinafter, referred to as an item condition) 76. The item label image 70 is printed on the label sheet. The label sheet on which the item label image 70 has been printed (hereinafter, referred to as an item label 78) is then adhered onto the item. As the barcode 72 of the item label image 70 of the item label 78 adhered onto the item is scanned by an image scanner, the item is identified based on the item label image 70. It is noted that various types of generally used scanners capable of analyzing a barcode or various barcode scanners dedicated to scan barcodes may be used as the image scanner for reading the item label 78.

Figure 3:
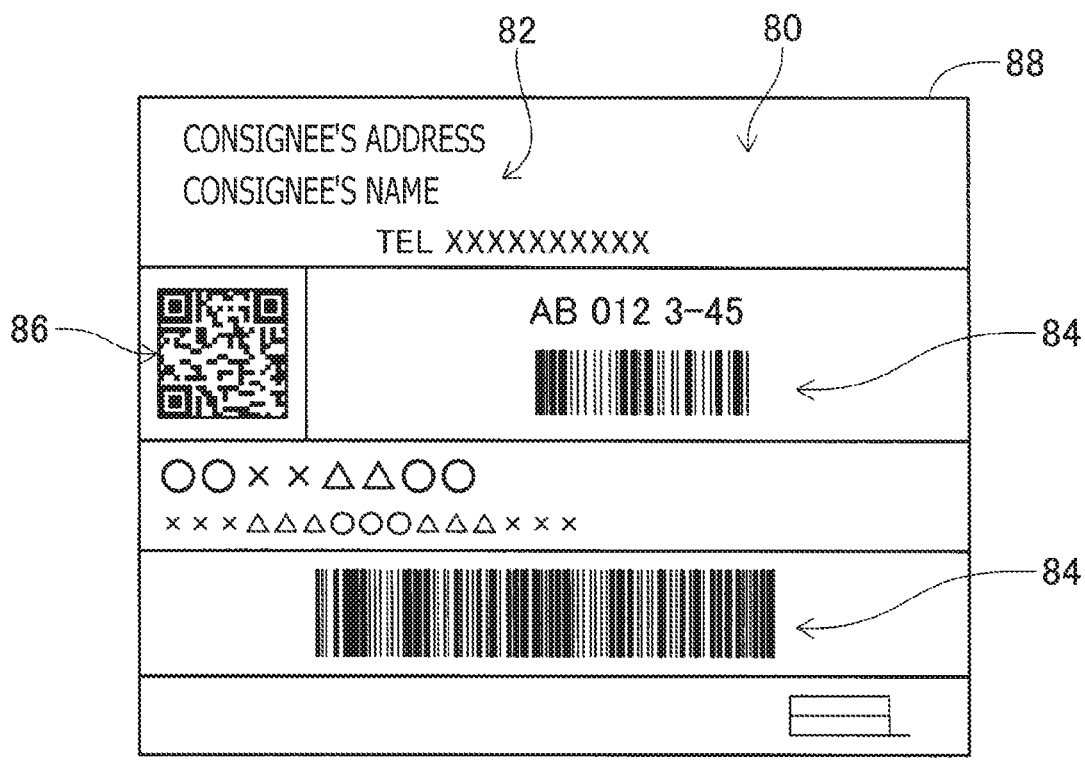
FIG. 3 shows an example of a delivery label.

The delivery label image 80 is used for delivering items (an example of a first usage) and contains, as shown in FIG. 3, delivery destination information 82 representing a destination (e.g., a consignee's address and a consignee's name) to which the item is to be delivered, a plurality of barcodes 84 indicating information intrinsic to the item and a QR Code® 86. The delivery label image 80 is printed on the label sheet, and the label sheet on which the delivery label image 80 has been printed (hereinafter, referred to as a delivery label 88) is adhered onto a package of the item, thereby destination of the item being recognizable based on the delivery label image 80. Further, as the barcode 84 of the delivery label image 80 is read by an image scanner, the information intrinsic to the item can be obtained. It is noted that the delivery label image 80 contains delivery information 82 including, for example, the consignee's address (i.e., the address of the delivery destination). Therefore, the delivery information 82 is indicated largely to some extent so that the address and the like are correctly identified by the delivery information. Therefore, the delivery label image 80 is relatively large in comparison with the item label image 70.

Figure 4:
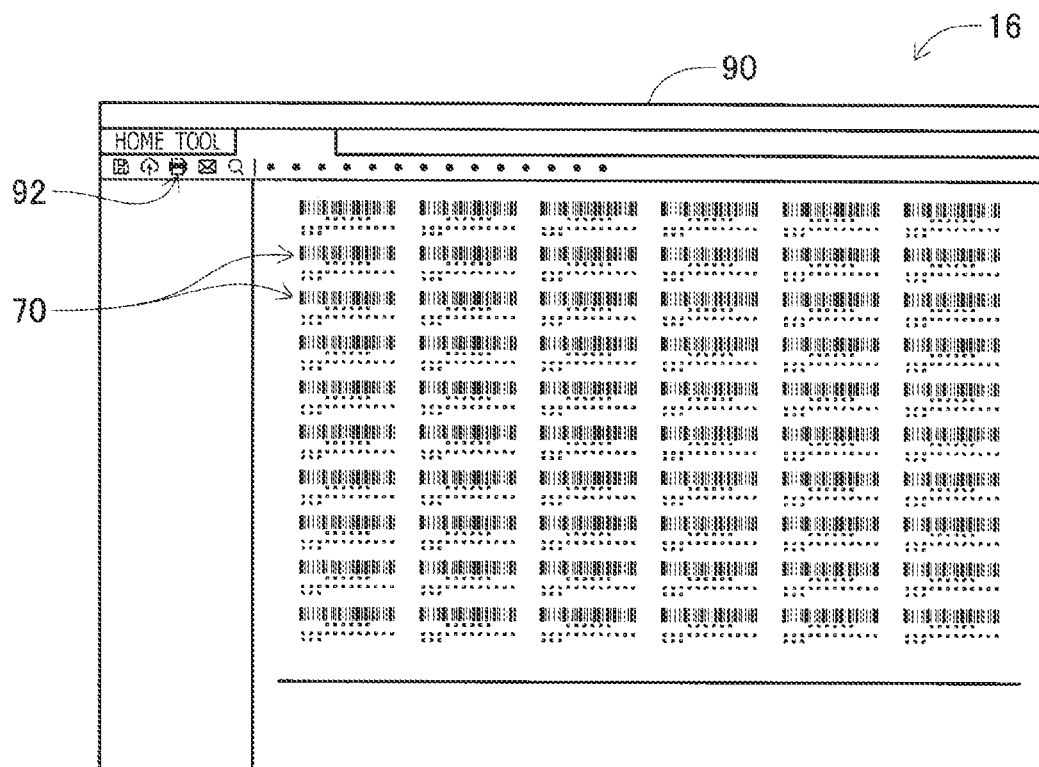
FIG. 4 is an example of a label image displaying screen on which a plurality of item labels is displayed.

When the user needs the item label 78, the user uses the PC 10 to obtain the image data of the item label image 70 from the server 52. The image data obtained from the server 52 is typically PDF format image data, and the control program 26 is an application configured to display the image data of the PDF format. Accordingly, based on the PDF format image data obtained from the server 52, the control program 26 displays a label image display screen 90 on the LCD 16 as shown in FIG. 4. It is noted that the PC 10 has already obtained image data of an A4 size sheet (hereinafter, referred to as A4 size image data) from the server 52. The A4 size image data includes image data of a plurality of item label images 70. Therefore, on the label image display screen 90, a plurality of item label images 70 are displayed.

Figure 5:
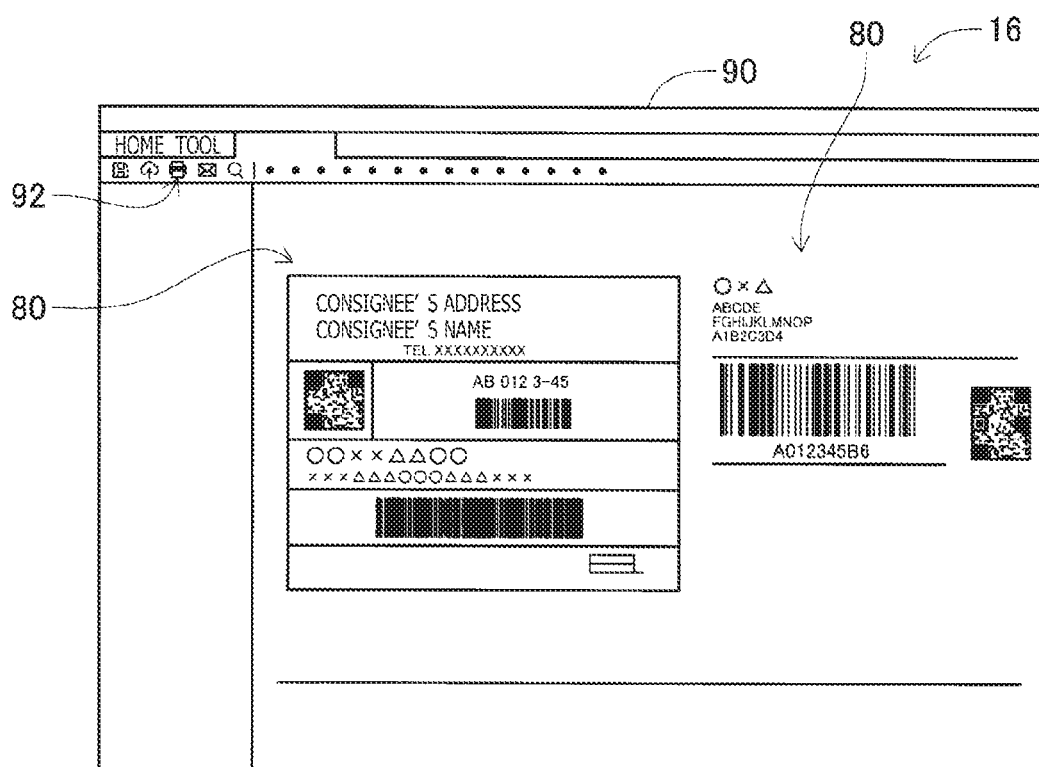
FIG. 5 is an example of a label image displaying screen on which the delivery label image is displayed.

When the user needs the delivery label 88, the user uses the PC 10 to obtain the image data of the delivery label image 80 from the server 52. Then, the control program 26 displays the label image display screen 90 on the LCD 16, as shown in FIG. 5, based on the image data of the delivery labels 88 obtained from the server 52. It is noted that the PC 10 has obtained the A4 size image data, which contains image data of two delivery label images 80 (see FIG. 5). Therefore, two delivery label images 80 are displayed on the label image display screen 90.

Figure 2:
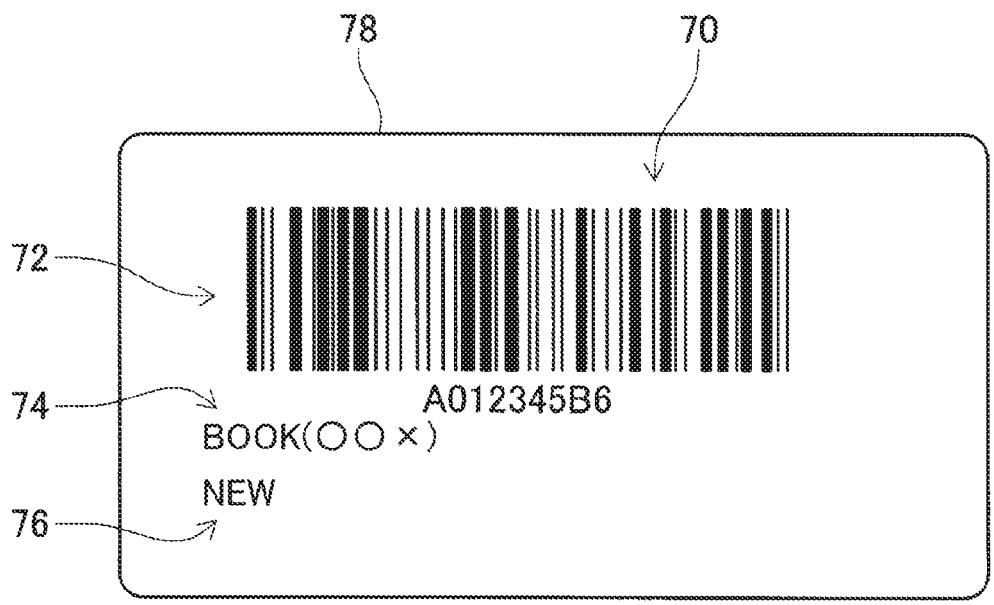
FIG. 2 shows an example of an item label.

Further, on one label sheet, one item label image 70 or one delivery label image 80 is normally printed as shown in FIGS. 2 and 3. On the other hand, the PC 10 has A4 size image data which is an A4 size image containing a plurality of item label images 70 or A4 size image data which is an A4 size image containing a plurality of delivery label images 80 from the server 52. Therefore, it is necessary to extract image data of one item label image 70 or one delivery label image 80 from the A4 size image data.

Therefore, in the PC 10, the printer driver 28 performs a process of extracting a part of an image and printing the extracted image, that is, a so-called a crop-printing process (which is an example of an extract-print process). It is noted that, in the following description, the processes performed by the printer driver 28 will be described in detail referring to the flowcharts shown in FIGS. 12-14.

Figure 6:
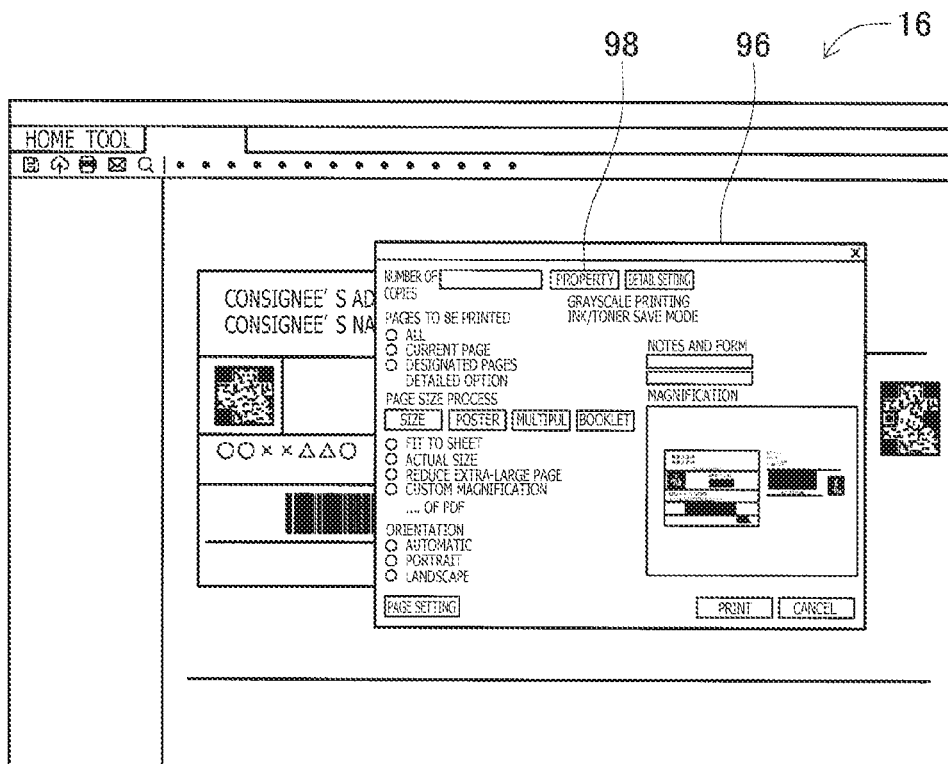
FIG. 6 shows an example of an APP-compliant setting screen.
Figure 7:
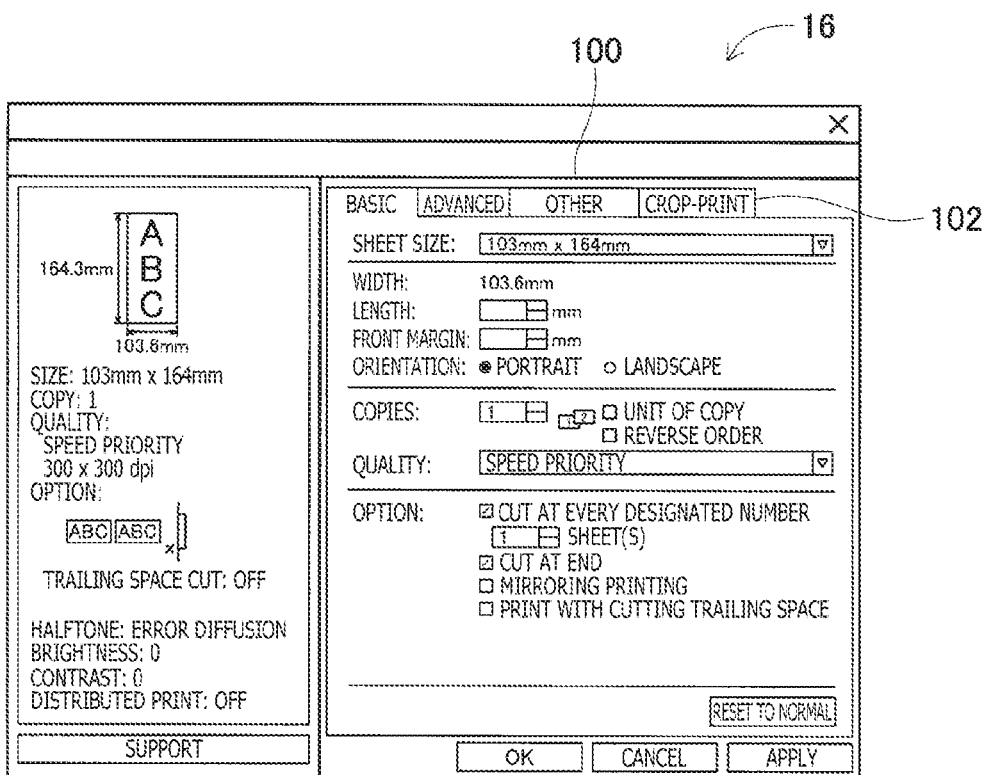
FIG. 7 shows an example of a driver-compliant first setting screen.

When a print button 92 in the label image display screen 90 is operated (see FIG. 4 or 5), the control program 26 displays an APP-compliant setting screen 96 as shown in FIG. 6 on the LCD 16. Then, when a property button 98 on the APP-compliant setting screen 96 is operated, the control program 26 calls an API (S100: YES) and the printer driver 28 is requested to display a setting screen. In response to the request, a main module 34 of the printer driver 28 displays a driver-compliant first setting screen 100 as shown in FIG. 7 on the LCD 16 (S102).

Figure 8:
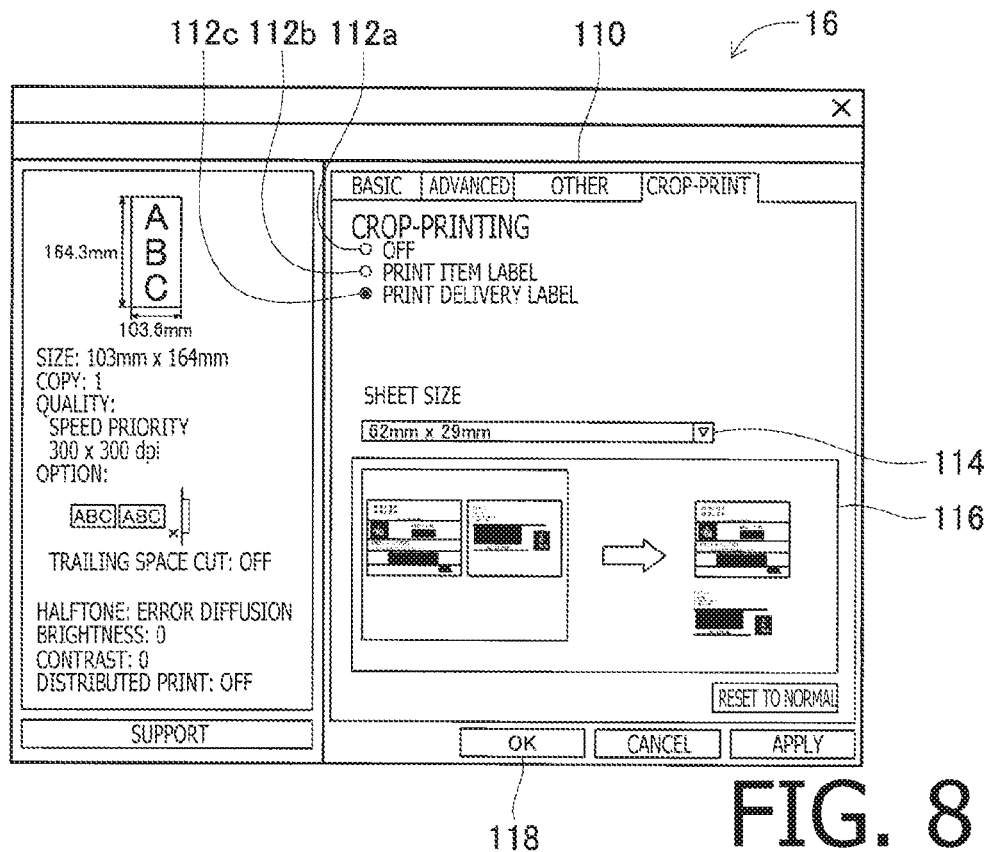
FIG. 8 shows an example of a driver-compliant second setting screen.

The driver-compliant first setting screen 100 is a screen used to make basic settings in the printing process. On the driver-compliant first setting screen 100, various setting buttons for setting sheet size and the like are displayed. As the user operates the setting buttons, basic printing conditions are set. Further, on the driver-compliant first setting screen 100, a crop-print tab 102 is also displayed. When the crop-print tab 102 is operated (S104: YES), the main module 34 of the printer driver 28 displays a driver-compliant second setting screen 110 as shown in FIG. 8 on the LCD 16 (S106).

The driver-compliant second setting screen 110 is a screen through which the user inputs print setting information for the crop-printing process performed by the printer 50. On the driver-compliant second setting screen 110, radio buttons 112a, 112b and 112c (which will also be collectively referred to as radio buttons 112) used to set the crop-printing process, a size setting button 114 used to input the size of the label sheet, a print image 116 of the label image to be printed in the crop-printing process and the like.

It is noted that the radio buttons 112 displayed on the driver-compliant second setting screen 110 include the radio button 112a for selecting a normal printing process (not the crop-printing process), the radio button 112b for selecting a printing process of the item label image 70 as the crop-printing process (which is an example of a second extract printing process) and the radio button 112c for selecting a printing process of the delivery label image 80 as the crop-printing process (which is an example of a second extract printing process). When the size setting button 114 is operated, a pull-down menu is displayed. In the pull-down menu, sizes of the label sheets usable in the printing process selected by the radio buttons 112 are displayed. As the user selects a desired sheet size from the sizes displayed on the pulldown menu, the size of the sheet to be used in the printing process is set.

When the radio button 112a is operated, the normal printing process is performed. In the normal printing process, the size of the sheet is not limited as far as the sheet is usable in the printer 50. Therefore, when the radio button 112a is operated, the sizes of the printing sheets on which the printer 50 can print images are indicated on the pulldown menu. The sizes of the printing sheets in this case include, for example, "58 mm," "102 mm," "50 mm×85 mm," "60 mm×92 mm," "102 mm×50 mm," "102 mm×102 mm" and "102 mm×152 mm."

When the radio button 112c is operated, the crop-printing process of the delivery label image 80 (hereinafter, referred to as a delivery label printing process) is performed. The delivery label image 80 to be printed in the delivery label printing process is a relatively large image as mentioned above. Accordingly, when the size of the label sheet is small, the delivery label image 80 cannot be printed thereon. Therefore, in the delivery label printing process, the sheet size settable in the print setting is limited to a particular size or more. According to the illustrative embodiment, the size of the printing sheet usable in the delivery label printing process is limited to one, of which width is four inches or more. Therefore, when the radio button 112*a* is operated, on the pulldown menu, the sheet sizes are displayed such that the sheet of which width is less than four inches are excluded. That is, the size displayed on the pulldown menu in this case are "102 mm," "102 mm×50 mm," "102 mm×102 mm" and "102 mm×152 mm." According to this configuration, it is avoided that the sheets on which the delivery label image 80 cannot be printed are selected.

When the radio button 112*b* is operated, the crop-printing process of the item label image 70 (hereinafter, referred to as an item label printing process) is performed. The item label image 70 to be printed in the item label printing process is, as mentioned above, an image smaller than the delivery label image 80. Therefore, in the item label printing process, as in the normal printing process, there is no limitation regarding the size of the printing sheet as far as the printer 50 can print images on the sheet. Accordingly, when the radio button 112*b* is operated, the sizes of the printing sheets indicated below is displayed on the pulldown menu. That is, the sizes indicated in the pulldown menu include, for example, "58 mm," "102 mm," "50 mm×85 mm," "60 mm×92 mm," "102 mm×50 mm," "102 mm×102 mm" and "102 mm×152 mm."

Figure 9:
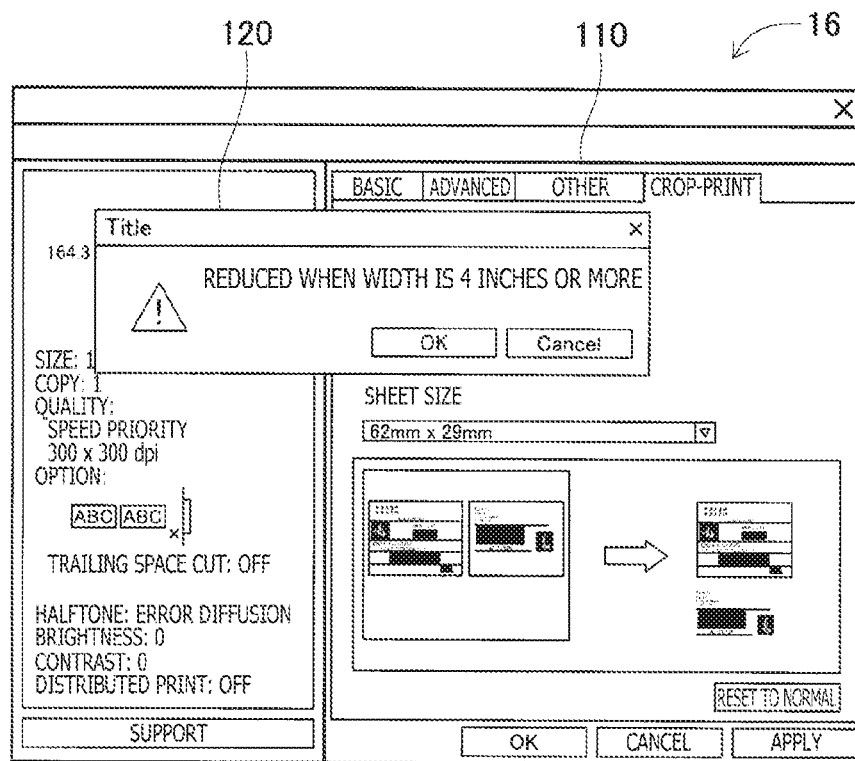
FIG. 9 shows an example of a notification screen.

When the radio button 112*c* is operated, the delivery label printing process is performed. It is noted that the delivery label image 80 printed in the delivery label printing process is, as mentioned above, a relatively large image. Therefore, when the delivery label printing process is performed, the size of the label sheet which can be set to the printer 50 is limited to one of which width is four inches in width or more. Even if the size of the label sheet is four inches in width, there could be a case where the size of the delivery label image 80 is larger than a printing area of the label sheet. In such a case, the delivery label image 80 is reduced and printed on the label sheet. Because of this configuration, when the radio button 112*c* is operated, as shown in FIG. 9, a notification screen 120 indicating that the delivery label image 80 is larger than the size of the label sheet and will be printed in a reduced manner on the LCD 16. Accordingly, the user can recognize, in advance, that the delivery label image 80 which is larger than the label sheet will be printed on the delivery label sheet in a reduced manner.

In the driver-compliant second setting screen 110, when the OK button 118 is operated after a printing process is selected in response to operation of the radio button 112 and setting of the sheet size is done in response to operation of the size setting button 114, the printer driver 28 requests the control program 26 for the image data representing an image having a size corresponding to the selected printing process. Concretely, the printer driver 28 outputs size information indicating the size corresponding to the selected printing process to the control program 26 through the OS 32. It is noted that the printer driver 28 does not need to output a command explicitly indicating a "request." The control program 26 transmits the image data representing an image of which size is equal to one indicated by the size information to the printer driver 28. Alternatively, the control program 26 may transmit the image data to the printer driver 28 in accordance with the size information output by the printer driver 28 not through the OS 32.

Specifically, when the radio button 112*a* is operated, the normal printing process is performed. In the normal printing process, the image extraction process is not performed, and the printer drive 28 prints the image represented by the image data obtained from the control program 26 on the label sheet. Therefore, when the radio button 112*a* is operated (S108: NO), the main module 34 of the printer driver 28 requests the control program 26 for the image data of which size (an example of a second size) is the size of the label sheet set based on the operation of the size setting button 114 (S110). At this stage, the main module 34 outputs information indicating the printing process selected based on the user operation, that is, the normal printing process selected by the operation of the radio button 112*a* as well as the request for the image data having the size same as the label size to the control program 26.

When receiving the request from the printer driver 28, the control program 26 transmits the image data corresponding to the size of the label sheet in accordance with the request to the printer driver 28. At this stage, the control program 26 generates image data converted to vector format image data which can be interpreted by the printer driver 28 based on the PDF format image data obtained from the server 52 to the printer driver 28 through the OS 32. Further, the control program 26 also transmits, together with the image data, information representing a printing process in which the image data is subjected to be printed (hereinafter, such information being referred to as subject process information: which is an example of particular data) to the printer driver 28. That is, the control program 26 outputs image data and the subject process information indicating that the printing process in which the image data is subjected to be processed is the normal printing process to the printer driver 28. It is noted that the control program 26 may output bitmap format image data to the printer driver 28.

When the radio button 112*b* or 112*c* is operated in the driver-compliant second setting screen 110, the crop-printing process is performed. In the crop-printing process, the label image is extracted from the image which the PC 10 obtained from the server 52, and the extracted label image is printed on the label sheet. Therefore, when the radio button 112*b* or 112*c* is operated, the main module 34 of the printer driver 28 request the control program 26 for the image data corresponding to the image size the PC 10 obtained from the server 52.

The PC 10 obtains the image data of the A4 size image from the server 52 as described above. It is noted that there could be a case where the PC 10 obtains the image data of a latter size image from the server 52. Therefore, the main module 34 request for the image data corresponding to the size covering both the A4 size image and the Letter size image. It is noted that the dimension of the A4 size is 210 mm×297 mm, while the dimension of the Letter size is 215.9 mm×279.4 mm. Accordingly, the dimension which covers both the A4 size and the Letter size is 215.9 mm×297 mm (hereinafter, referred to as an A4-Letter size). Thus, when the radio button 112*b* or 112*c* is operated (S108: YES), the main module 34 request for the image data representing an image of the A4-Letter size (which is an example of a first size) (S112). At this stage, the main module 34 also outputs information indicating the crop-printing process selected by the operation of the radio button 112*b* or 112*c* (i.e., information indicating the item label printing process or the delivery label printing process) to the control program 26 as well as the request for the A4-Letter size image data. Then, the control program 26 receives request for the information indicating the designated crop-printing process as well as the A4-Letter size image data.

Then, in response to the request, the control program 26 transmits the image data of the A4-Letter size printing sheet to the printer driver 28. At this stage, the control program 26 outputs, to the printer driver 28, the image data, which is the vector format image data that can be interpreted by the printer driver 28, is converted from the PDF format image data obtained from the server 52. Further, the control program 26 also transmits information obtained from the printer driver 28 and indicating the process is the item label printing process or the delivery label printing process to the printer driver 28 as the subject process information as well as the image data.

Then, after receiving the vector format image data from the control program 26 (S200), the main module 34 of the printer driver 28 requests the OS 32 to convert the vector format image data to the bitmap format image data (S202). Upon receipt of the request, the OS 32 converts the vector format image data to the bitmap format image data and outputs the converted image data to the printer driver 28. As above, the printer driver 28 receives the bitmap format image data (S204). That is, the image data suitable for outputting to the OS 32 is transmitted from the control program 26 to the OS 32, the OS 32 converts the received image data to the image data suitable for outputting to the printer driver 28, and the printer driver 28 receives the thus converted image data. Receipt of the image data and receipt of the image data associated with a data converting process described above, via the OS 32, are examples of a mode of receipt of the image data, which is transmitted from the control program 26, by the printer driver 28.

Next, when receiving the bitmap format image data, the main module 34 of the printer driver 28 determines whether the received image data (hereinafter, referred to as reception data) is subjected to the crop-printing process (S206). This decision is performed based on the subject process information which is received together with the reception data. When it is determined that the reception data is not subjected to the crop-printing process (S206: NO), that is, when the subject process information indicates the normal printing process, the main module 34 determines whether the reception data is the label sheet size image data (S207). When it is determined that the reception data is not the label size image data (S207: NO), since the normal printing process cannot be performed with the data, an error process will be performed (S208). When it is determined that the reception data is the label sheet size image data (S207: YES), the main module 34 generates printing image data based on the reception data (S209). Then, the main module 34 transmits the thus created printing image data to the printer 50 (S210). Then, in the printer 50, the normal printing process is performed.

When it is determined that the reception data is subjected to the crop-printing process (S206: YES), that is, when the subject process information indicates at least one of the delivery label printing process and the item label printing process, the main module 34 of the printer driver 28 determines whether the reception data is the A4-Letter size image data (S211). When it is determined that the reception data is not the is not the A4-Letter size image data (S211: NO), since the crop-printing process cannot be performed, an error process will be performed (S208). When it is determined that the reception data is the A4-Letter size image data (S211: YES), the main module 34 determines whether the reception data is subjected to the delivery label printing process (S212). It is noted that this decision is made based on the subject process information received together with the reception data.

When the reception data is not subjected to the delivery label printing process (S212: NO), that is, when the subject process information indicates the item label printing process, the sub module 36 of the printer driver 28 identifies information regarding a position of the item label image 70 in the image represented by the reception data (hereinafter, the position will be referred to as item label position information (S214).

That is, the sub module 36 firstly analyzes bitmap format reception data and detects the image data indicating the barcode 72. Then, the sub module 36 obtains the position information indicating a position of the image of the barcode 72 as detected as the position information indicating the barcode 72 contained in the item label image 70. Then, the sub module 36 operates an offset amount of the barcode 72. That is, the offset amount is defined as a positional coordinate of one of four vertexes of the barcode 72 with respect to one of four vertexes (e.g., an upper left vertex) of a rectangular image represented by the bitmap format image data is calculated. In the printer driver 28, a width dimension and a height dimension of the item label image 70 are input in advance. Therefore, the sub module 36 identifies item label image position information which indicates positional coordinate of the referential vertex among the four vertexes of the item label image 70 with respect to the referential vertex of the rectangular image indicated by the bitmap format image based on the offset amount of the barcode 72 and the width dimension and the height dimension of the item label image 70. At this stage, if the item label image position information cannot be identified (S216: NO), an error process is performed (S208).

When the reception data is subjected to the delivery label printing process (S212: YES), that is, when the subject process information indicates the delivery label printing process, the sub module 36 of the printer driver 28 identifies information regarding the position of the delivery label image 80 within the image represented by the reception data (hereinafter, referred to as delivery label image position information) (S218). Specifically, the sub module 36 firstly analyzes the bitmap format reception data and detects the image data representing a barcode 84 and a QR code 86. Thereafter, the sub module 36 obtains the position information indicating a position of the image represented by the image data as detected as the position information indicating positions of the barcode 84 and the QR code 86 contained in the delivery label image 80.

Figure 10:
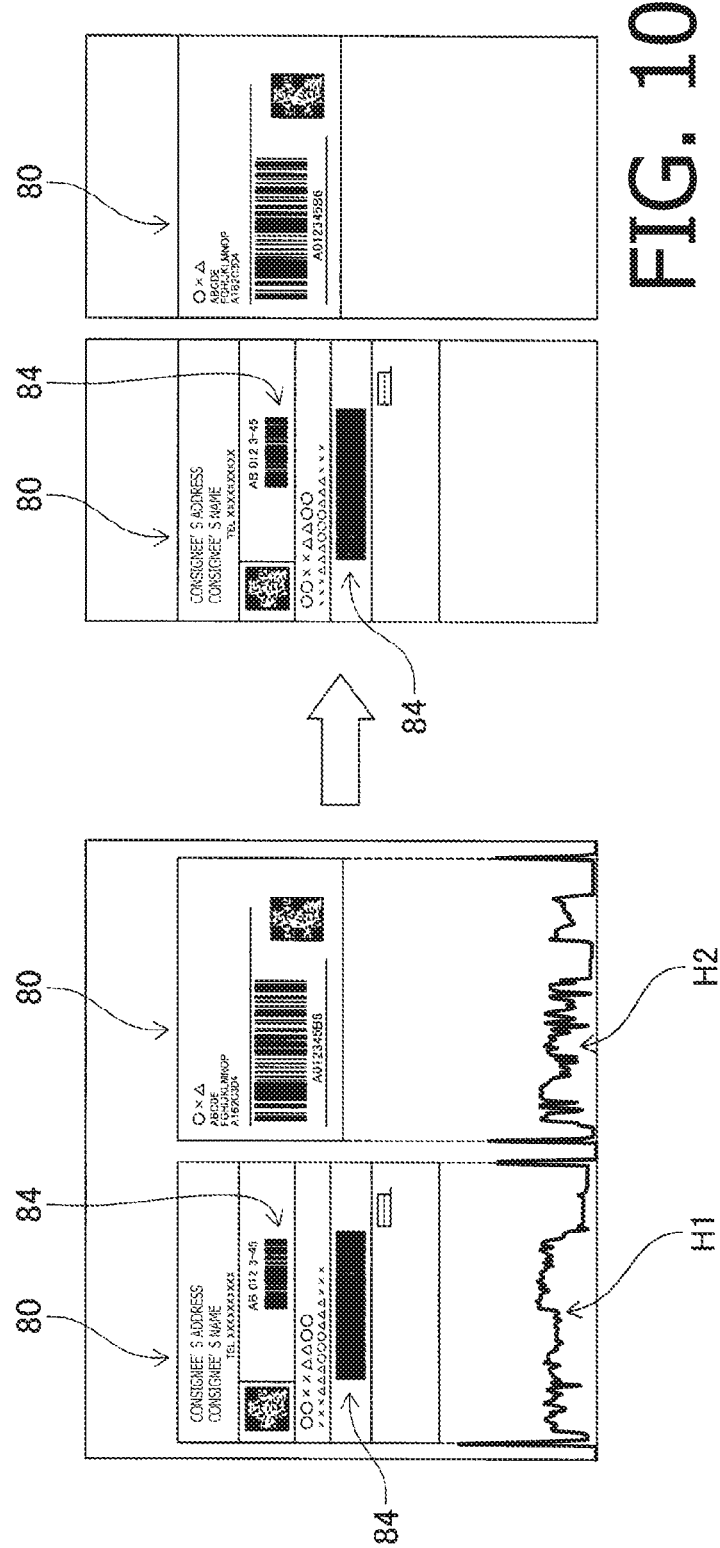
FIG. 10 shows a projection histogram which is used when delivery label image location information is identified.

The sub module 36 detects a direction where bars constituting the barcode 84 extend based on the image data of the barcode 84 as detected. Then, as shown in FIG. 10, the sub module 36 generates projection histograms H1 and H2 in a direction perpendicular to the direction where the bars of the barcode 84 extend. In this case, the projection histogram in the direction perpendicular to the extending direction of the bars is analyzed, and a continuous portion where the number of detections is zero has a particular length (e.g., a length corresponding to 50 dots), the portion where the number of detections is zero is regarded as a portion where the delivery label image 80 does not exist. Accordingly, in the image shown in FIG. 10, it is presumed that the delivery label image 80 does not exist within a central portion, while the delivery label image 80 exists within each of right and left portions.

Figure 11:
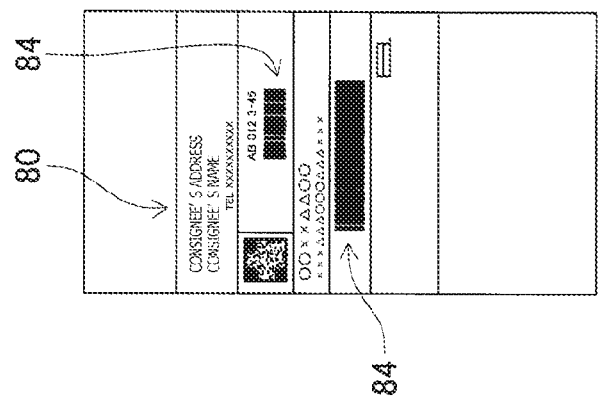
FIG. 11 shows another projection histogram which is used when delivery label image location information is identified.
Figure 11:
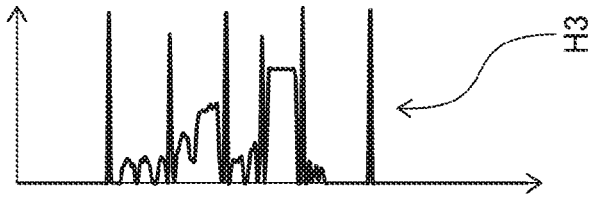
Figure 11:
Figure 11:
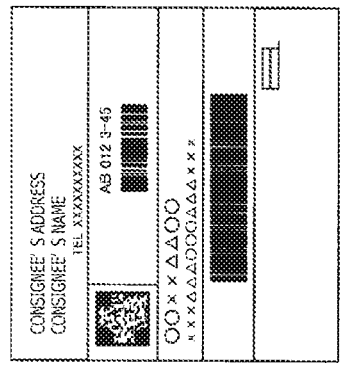

Next, the sub module 36 generates a projection histogram H3 in the direction where the bars of the barcode 84 extend for each area in which the delivery label image 80 is presumed to exist as shown in FIG. 11. It is noted that, in FIG. 11, the projection histogram H3 corresponding to a left-side one of the areas where the delivery label image 80 shown in FIG. 10 is presumed to be exist. Then, the sub module 36 detects an upper end and a lower end of the delivery label image 80 based on the projection histogram, and identifies delivery label image position information based on the upper and lower ends of the delivery label image 80.

As described above, when the delivery label image position information is identified by the sub module 36, the sub module 36 extracts the image data of the delivery label image 80 from the reception data based on the delivery label image position information (S220). Next, the sub module 36 determines whether the delivery label image 80 represented by the extracted image data can be printed within the printing area of the label sheet selected by the user (S222). It is noted that the size of the label sheet selected by the user is the size selected as the user operated the size setting button 114 on the driver-compliant second setting screen 110. When it is determined that the delivery label image 80 can be printed within the printing area of the label sheet selected by the user (S222: YES), the delivery label image 80 is stored in the data storage area 38 (S225).

When it is determined that the delivery label image 80 cannot be printed within the printing area of the user-selected label sheet (S222: NO), the sub module 36 reduces the delivery label image 80 within a range where quality of the barcode can be maintained (S224). In other words, the sub module 36 reduces the delivery label image 80 to maintain the image quality of the reduced barcode 84 and the reduced QR code 86 so that code information can still be readable from the reduced images. It is noted that the size with which the image quality is maintained is the size designed, in advance, by the vendor of the printer driver 28 such that the code information can be read with the image scanner even if the delivery label image 80 has been reduced. It is noted that a reduction ratio of the barcode may be limited so that the delivery label image 80 is reduced at a particular reduction ratio or larger. Alternatively, the delivery label image 80 may be reduced such that the thinnest one of the plurality of bars constituting the barcode has a particular size or more. Alternately or optionally, the delivery label image 80 may be reduced such that the thickest one of the plurality of bars constituting the barcode has a particular size or more.

When the delivery label image 80 is reduced, the size of the barcode 84 and the QR code 86 may remain unreduced and only the other objects may be reduced. Alternatively, the barcode 84 and the QR code 86 may also be reduced within a range such that the code information can be read from the reduced barcode 84 or the QR code 86. Then, the reduced delivery label image 80 may be stored in the data storage area 38 (S225).

When the delivery label image position information is identified in the reception data and the image data of the deliver delivery label image 80 is extracted from the reception data, if the delivery label image position information cannot be identified and the delivery label image 80 cannot be extracted (S216: NO), an error process is performed (S208).

When the sub module 36 has identified the item label image position information, that is, when the reception data is subjected to the item label printing process (S226: NO), the main module 34 obtains the item label image position information from the sub module 36, and extracts the image data of the item label image 70 from the reception data based on the obtained item label image position information (S228).

When the delivery label image 80 is extracted by the sub module 36, that is, when the reception data is subjected to the delivery label printing process (S226: YES), the main module 34 obtains information for identifying a storage destination of the delivery label image 80 that is stored in the data storage area 38 by the sub module 36, that is, information necessary for obtaining the delivery label image 80 from the data storage area 38 in which the sub module 36 stored the delivery label image 80, and based on the thus obtained information, the main module 34 obtains the image data of the delivery label image 80 from the data storage area 38 (S229).

That is, when the reception data is subjected to the item label printing process, the sub module 36 identifies the item label image position information and extracts the item label image 70 from the reception data. On the other hand, when the reception data is subjected to the delivery label printing process, the sub module 36 identifies the delivery label image position information and the main module 34 extracts the delivery label image 80 from the reception data.

Next, the main module 34 determines whether the extracted image (e.g., the item label image 70 extracted by the main module 34, the delivery label image 80 extracted by the sub module 36, the delivery label image 80 extracted by the sub module 36 and reduced) can be printed within the printing area of the label sheet of which size is selected in accordance with the user operation (S230). When it is determined that the extracted image cannot be printed within the printing area of the label sheet selected by the user (S230: NO), an error process is performed (S208).

When it is determined that the extracted image can be printed within the printing area of the label sheet selected by the user (S230: YES), the main module 34 generates the printing image data based on the image data of the extracted image (S209). In this case, the printing image data representing an image in which the extracted image is arranged on the label sheet of which size was selected in accordance with the user operation is generated. Then, the main module 34 transmits the thus generated printing image data to the printer 50 (S210). As above, in the printer 50, the crop-printing process, that is, the delivery label printing process or the item label printing process is performed.

It is noted that the process of S106 executed by the CPU 12 is an example of a first display controlling process and a second display controlling process. The processes of S110 and S112 executed by the CPU 12 are examples of a first outputting process. The process of S200 executed by the CPU 12 is an example of a receiving process. The process of S206 executed by the CPU 12 is an example of an identifying process. The process of S209 executed by the CPU 12 is an example of a generating process. S210 executed by the CPU 12 is an example of a transmitting process. The processes of S220 and S228 executed by the CPU 12 are examples of an extracting process.

According to aspects of the above-described illustrative embodiment, the following effects can be achieved.

When the image data received from the control program 26 contains the item label image 70 or the delivery label image 80, the size of the image represented by the image data received from the control program 26 is A4-Letter size, and the subject process information indicates the crop-printing process (i.e., the sheet size selected by the user is the label size), the printer driver 28 extracts the image data of the item label image 70 or the delivery label image 80 from the image data received from the control program 26. Then, the printer driver 28 generates the printing image data based on the extracted image data and transmits the same (i.e., the printing image data) to the printer 50. Then, the printing process of the item label image 70 or the delivery label image 80 is performed without needing the user operation to designate the item label image 70 or the delivery label image 80.

It is noted that the printer 50 is not configured to print an image on a cut sheet such as an A4 size sheet, but is configured to print an image on a label size sheet. Further, the printer driver 28 is configured to request the control program 26 for the A4-Letter size image data, and extract the item label image 70 or the delivery label image 80 from the A4-Letter size image data. Accordingly, the crop-printing process can be performed appropriately.

At the normal printing process is performed, the printer driver 28 requests the control program 26 for the label size image data and generates the printing image data based on the label size image data. Thus, the normal printing process can be appropriately performed.

The printer driver 28 is configured such that, when the extracted delivery label image 80 cannot be printed within the printing area of the label size sheet selected by the user operation, the printer driver 28 reduces the extracted image. Accordingly, even if the extracted delivery label image 80 is relatively large, it can be printed within the printing area of the label sheet selected by the user.

When the delivery label image 80 is reduced, the reduction ratio is adjusted so that the image quality of the barcodes 84 contained in the delivery label image 80 is maintained (i.e., the barcodes 84 contained in the reduced delivery label image can still be readable). According to this configuration, readability of the barcodes 84 is guaranteed.

According to the illustrative embodiment, the driver-compliant second setting screen 110, which is used when the user selects the crop-printing process or the normal printing process, is displayed on the LCD 16. When the user operates, on the driver-compliant second setting screen 110, to select the crop-printing process, the size of the printing sheet is changed to the label size. Accordingly, the crop-printing process is appropriately performed.

Further, the size setting button 114 for setting the size of the printing sheet is displayed on the driver-compliant second setting screen 110. In accordance with the user's operation of the size setting button 114, the printing image data, which is configured such that the item label image 70 or the delivery label image 80 is arranged on the print sheet of which size is selected by the user, is generated. Thus, the crop-printing process corresponding to the printing sheet of which size is selected by the user can be performed.

When the delivery label printing process is selected as the user operates the radio button 112b on the driver-compliant second setting screen 110, only the sheet sizes equal to four inches width or greater from among the sheet sizes usable by the printer 50 on the pulldown menu which is displayed as the user operates the size setting button 114. Accordingly, it is prevented that the user selects the printing sheets having a size on which the delivery label image 80 cannot be printed, thereby operability being improved.

When the item label printing process is selected as the user operates the radio button 112c on the driver-compliant second setting screen 110, not only the sheet sizes equal to four inches width or greater from among the sheet sizes but the sheet sizes less than four inches are indicated on the pulldown menu. Therefore, when the item label image 70 is relatively small, the user can select a small-sized printing sheet.

It is noted that aspects of the present disclosures should not be limited to the above-described configuration of the illustrative embodiment, but can be modified/improved based on the knowledge of a person skilled in the art. For example, in the above-described embodiment, when the reception data is subjected to the delivery label printing process, the sub module 36 identifies the delivery label image position information, and the main module 34 extracts the delivery label image 80 from the reception data. However, the above configuration may be modified such that both identifying the delivery label image position information and extraction of the delivery label image 80 from the reception data are performed by the sub module 36.

In the illustrative embodiment, as label images subjected to the crop-printing, the item label image 70 used for identifying the items and the delivery label image 80 used for delivering the items are employed. It is of course possible to employ, optionally or alternatively, various other images used for other purposes. Further, in the illustrative embodiment, the item label image 70 and the delivery label image 80 both having code information (e.g., the barcode) are employed as the label image subjected to the crop-printing process. However, it is also possible to employ label images which do not contain the code information.

In the illustrative embodiment, the printer driver 28 requests for the A4-Letter size image data. However, assuming that only the A4 size images are used, the printer driver 28 may be configured to request for only the A4 size image data. Alternatively, assuming that only the Letter size images are used, the printer driver 28 may be configured to request for only the Letter size image data. In the above case, the A4 size or the Letter size is an example of the first size.

In the illustrative embodiment, when the printer driver 28 receives the vector format image data from the control program 26, the printer driver 28 requests the OS 32 to convert the vector format image data to the bitmap format image data. The configuration may be modified such that the conversion of the vector format image data to the bitmap format image data is performed by the printer driver 28 itself. Further, the printer driver 28 may use the bitmap format image data, which is converted by the printer driver 28 itself, in the process in S206 onwards in FIG. 13. Alternatively, the control application 26 may be configured to output the bitmap format image data instead of the vector format image data. In this case, the printer driver 28 may receive the bitmap format image data output by the control application 26 and use the same in S206 onwards of FIG. 13.

Figure 12:
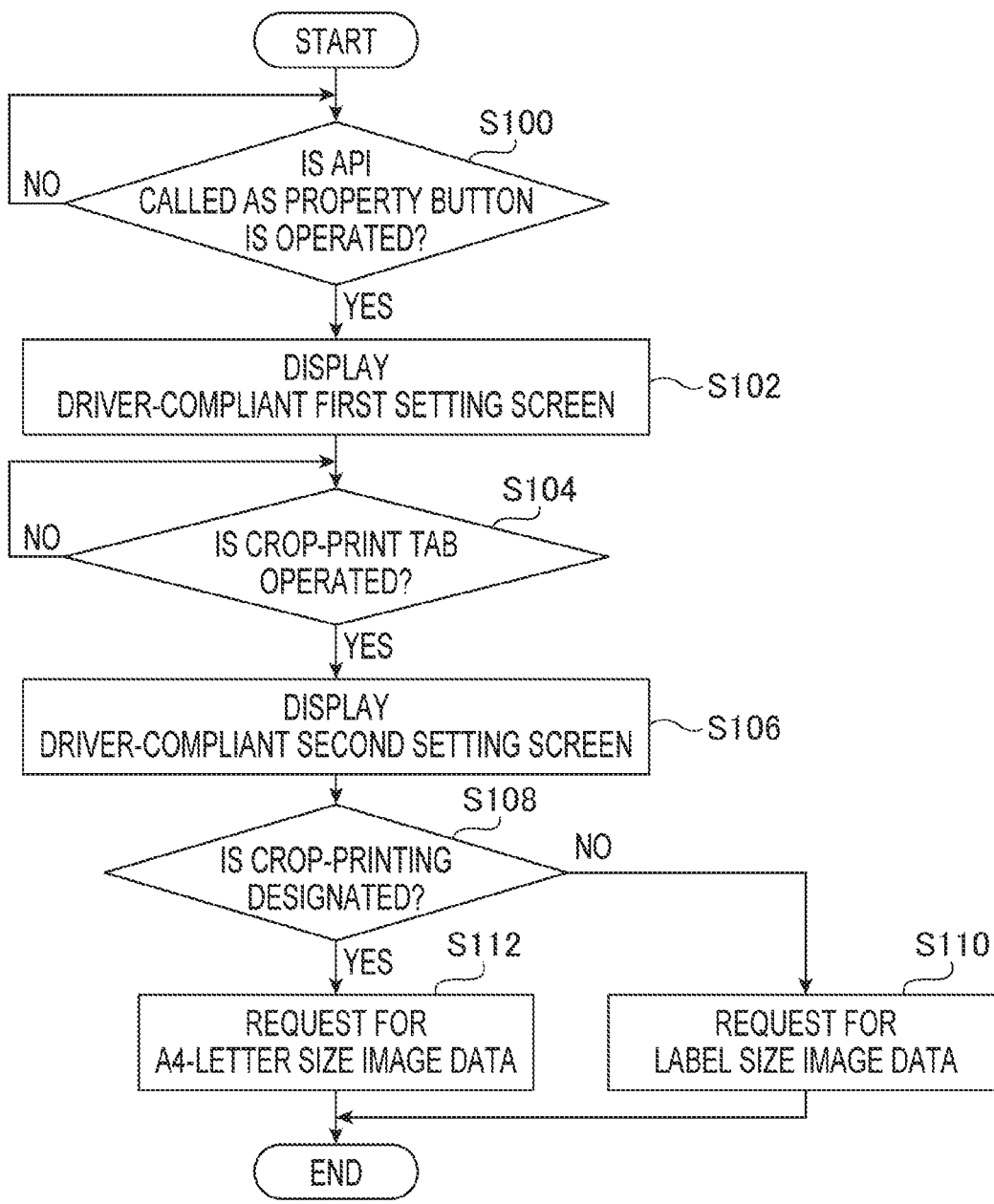
FIG. 12 is a flowchart illustrating a process performed by a printer driver.
Figure 13:
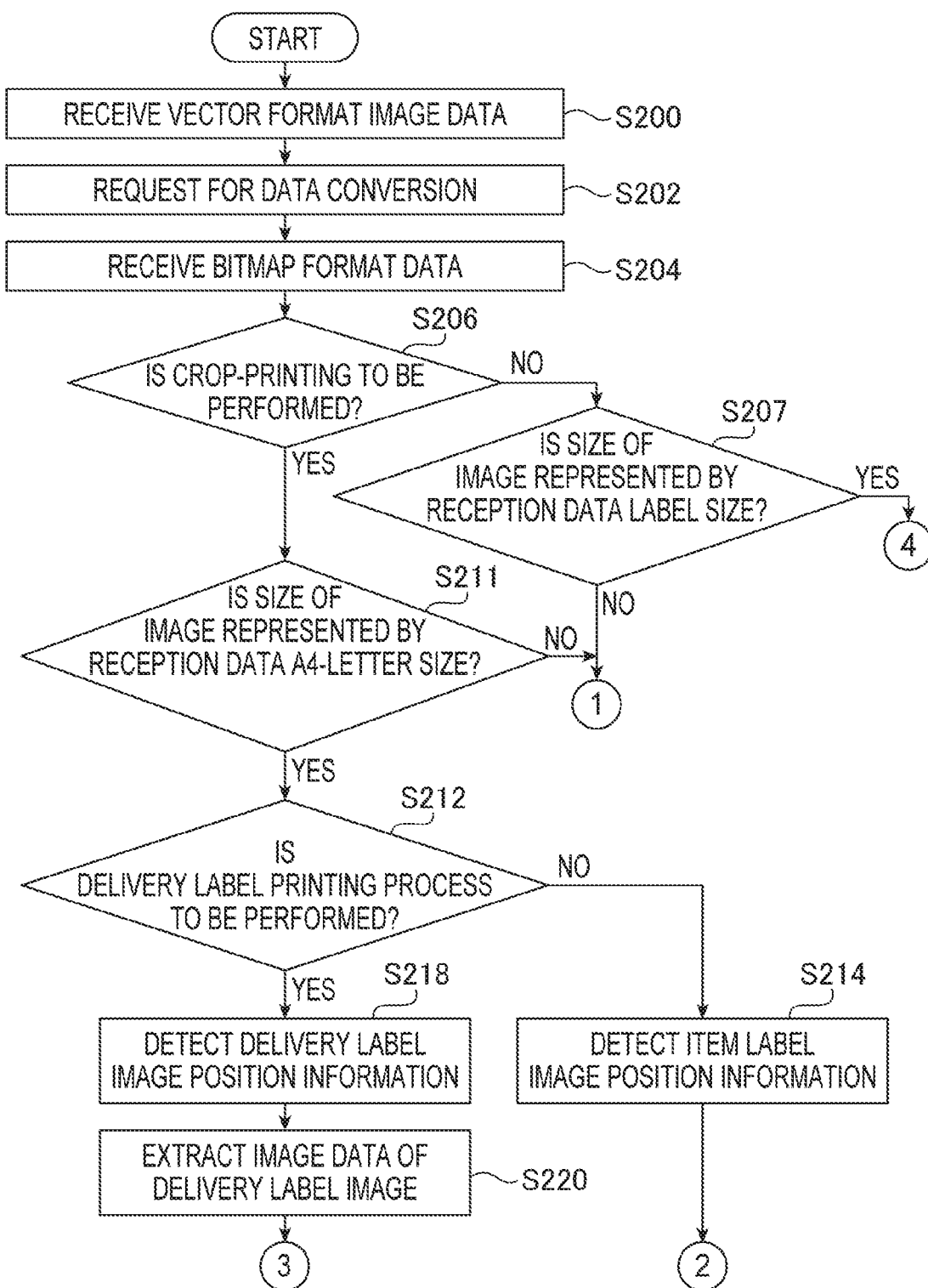
FIGS. 13-14 show a flowchart illustrating a process performed by the printer driver.
Figure 14:
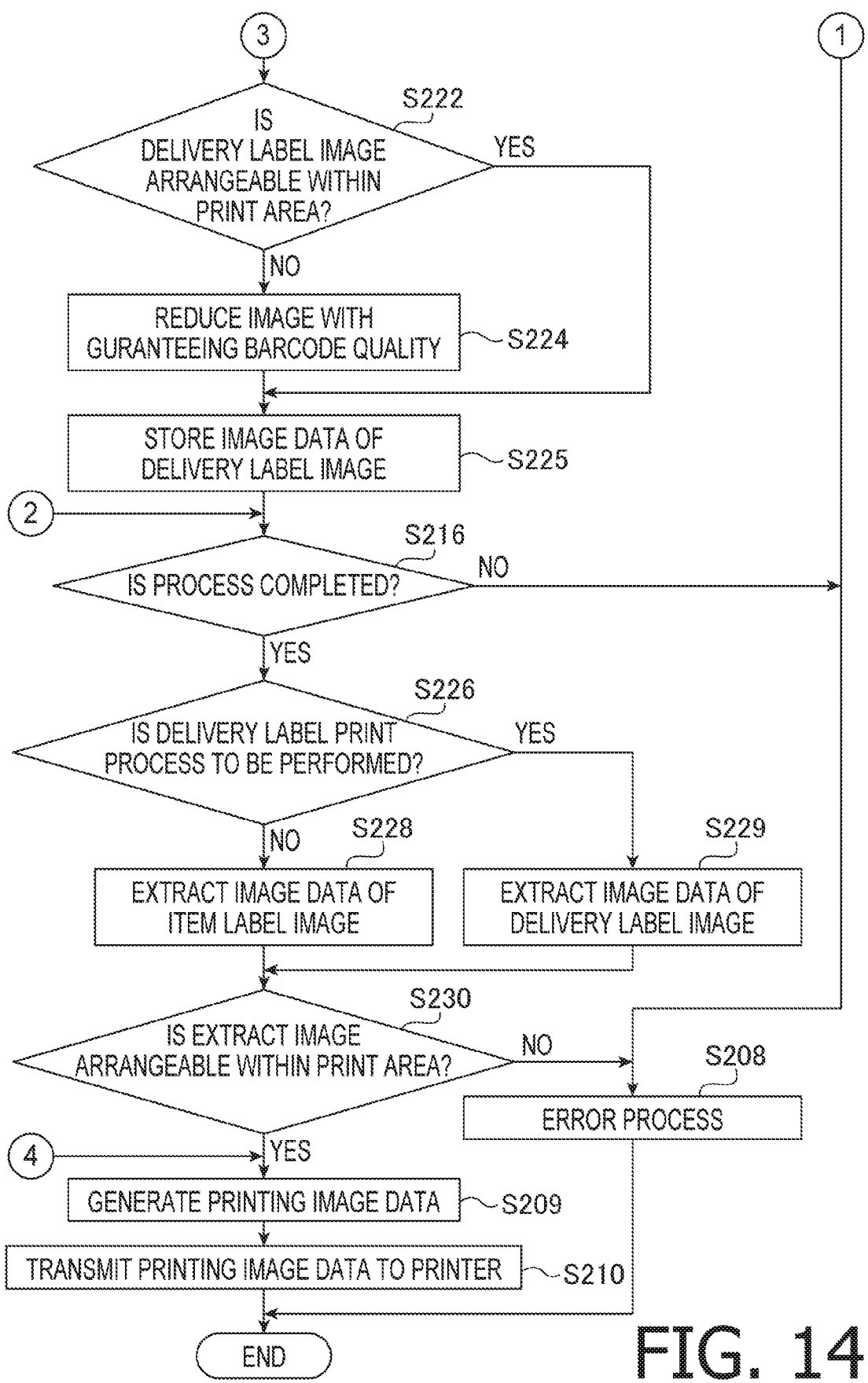

In the illustrative embodiment, the CPU 12 executes the processes shown in FIGS. 12-14. It is noted that the processes may be performed by an ASIC or other logical integrated circuits, or by a combination of the CPU 12, the ASIC and the other logical integrated circuits.

What is claimed is:

1. A non-transitory computer-readable recording medium for an information processing apparatus having a communication interface, an input interface configured to receive a user operation and a controller, the controller being configured to read an application which is configured to output image data, the recording medium storing computer-readable printing data generating instructions which cause, when executed by the controller, the information processing apparatus to perform:

a size selection screen displaying process of displaying a size selection screen on which a size of a sheet used for printing is selectable from among a plurality of sizes;

a size selection receiving process of receiving selection of a size of the sheet used for printing on the size selection screen through the input interface;

an image data receiving process of receiving image data which is output by the application;

a position identifying process of identifying position information regarding a position of a first object within an image represented by the received image data by analyzing the received image data;

an extracting process of extracting object image data representing the first object from the image data received in the image data receiving process based on the position information when:

the image data received in the image data receiving process represents an image in which the first object is arranged;

a size of the image is a first size; and the size selected in the size selection receiving process is a second size which is different from the first size;

a generating process of generating printing data causing a printer, which is connected with the information processing apparatus through the communication interface, to print an image in which the first object represented by the object image data extracted in the extracting process is arranged on the sheet having the second size;

an outputting process of outputting the printing data generated in the generating process, the printing data being transmitted to the printer through the communication interface;

a first display controlling process of displaying a process selection screen on a display interface of the information processing apparatus, a non-extract printing process and an extract printing process, which includes a first extract printing process, being selectable, from among a plurality of printing processes, on the process selection screen, the extract printing process being a process of extracting a part of an image and printing the extracted part of the image;

when the input interface receives the user operation, on the process selection screen, to select the extract printing process, in the size selection screen displaying process, and the first extract printing process has been selected, displaying the size selection screen on which a size of a sheet used for printing is selectable only from among sheet sizes having a sheet width equal to or greater than a particular width; and when the input interface receives the user operation, on the process selection screen, to select the non-extract printing process, in the size selection screen displaying process, displaying the size selection screen on which a size of a sheet used for printing is selectable from among sheet sizes having a sheet width both less than and equal to or greater than the particular width.

2. The non-transitory computer-readable recording medium according to claim 1, wherein the first size is a size of the sheet on which the printer is not configured to perform printing, wherein the second size is a size of the sheet on which the printer is configured to perform printing, wherein the printing data generating instructions cause, when executed by the controller, the information processing apparatus to:

perform a first outputting process of outputting first size information indicating that first image data representing the image having the first size is receivable; and receive, in the image data receiving process, the first image data representing the image having the first size and output by the application in accordance with output of the first size information in the first outputting process from the application.

3. The non-transitory computer-readable recording medium according to claim 2, wherein, the printing data generating instructions cause, when executed by the controller, the information processing apparatus to output one of the first size information and second size information to the application, such that:

when the first size is selected, in the first outputting process, from among the first size and the second size, outputting the first size information to the application; and when the second size is selected, in the first outputting process, from among the first size and the second size, outputting the second size information to the application, the second size indicating that image data representing an image having the second size is receivable, wherein the printing data generating instructions cause, when executed by the controller, the information processing apparatus to receive one of the first image data and second image data, such that:

when the first size information is output in the first outputting process, the information processing apparatus receives the first image data output by the application and representing the first size image; and when the second size information is output in the first outputting process, the information processing apparatus receives the second image data representing the second size image which is output by the application in response to output of the second size information in the first outputting process, and wherein the printing data generating instructions cause, when executed by the controller, the information processing apparatus to generate print data such that:

when the first image data is received in the image data receiving process and the object image data is extracted in the extracting process, the information processing apparatus generates the image data causing the printer to print an image in which a first object indicated by the object image data is arranged on the second size sheet, and when the second image data is received in the image data receiving process, the information processing apparatus generates the print data causing the printer to print an image represented by the second image data on the second size sheet.

4. The non-transitory computer-readable recording medium according to claim 1, wherein the printing data generating instructions cause, when executed by the controller, the information processing apparatus to generate print data such that:

when a size of the first object represented by the object image data extracted in the extracting process is larger than a print area of the second size sheet, the information processing apparatus generates the print data causing the printer to print an image in which a size-reduced first object is arranged within a print area of the second size sheet.

5. The non-transitory computer-readable recording medium according to claim 4,
    wherein the first object is an object containing a code image representing code information which is readable by an image scanner, and
    wherein the printing data generating instructions cause, when executed by the controller, the information processing apparatus to generate the print data such that:
        when a size of the first object represented by the object image data extracted in the extracting process is larger than a print area of the second size sheet, the information processing apparatus:
            reduces the first object with quality of the code image being maintained so that the code information can be read by the image scanner; and
            generates the print data causing the printer to print an image in which the reduced first object is arranged within the print area of the second size sheet.

6. The non-transitory computer-readable recording medium according to claim 1,
    wherein, when the input interface receives the user operation, on the process selection screen, to select the extract printing process, the information processing apparatus identifies the second size as the size of the sheet to be used for printing.

7. The non-transitory computer-readable recording medium according to claim 6,
    wherein, when the input interface receives the user operation, on the process selection screen, to select the extract printing process, the information processing apparatus performs a second display controlling process to display a size selection screen on which a size of the sheet used for printing is selectable from among a plurality of sizes, and
    wherein, in the generating process, the information processing apparatus sets the sheet size selected on the size selection screen to the second size and generates print data causing the printer to print an image in which a first object indicated by the image data extracted in the extracting process is arranged on the sheet having the sheet size selected on the size selection screen.

8. The non-transitory computer-readable recording medium according to claim 1,
    wherein, in the first display controlling process, the information processing apparatus displays a process selection screen on which one of the first extract printing process and a second extract printing process is selectable from among the plurality of printing processes on the display interface, the first extract printing process being a process of extracting an image to be used in a first purpose, the second extract printing process being a process of extracting an image to be used in a second purpose,
    wherein, when the input interface receives the user operation, on the process selection screen, to select the first extract printing process, the information processing apparatus displays, in a second display controlling process, a size selection screen on which the size of the sheet to be used for printing is selectable only from among sheet sizes equal to or larger than the particular width on the display interface, and
    wherein, when the input interface receives the user operation, on the process selection screen, to select the second extract printing process, the information processing apparatus displays, in the second display controlling process, a size selection screen on which a size of the sheet used for printing is selectable from among the sizes equal to or larger than the particular width and sizes less than the particular width on the display interface.

9. An information processing apparatus, comprising:
    a communication interface;
    an input interface configured to receive a user operation; and
    a controller, the controller being configured to read an application which is configured to output image data, and the controller controlling the information processing apparatus to automatically perform:
        a size selection screen displaying process of displaying a size selection screen on which a size of a sheet used for printing is selectable from among a plurality of sizes;
        a size selection receiving process of receiving selection of a size of the sheet used for printing on the size selection screen through the input interface;
        an image data receiving process of receiving image data which is output by the application;
        a position identifying process of identifying position information regarding a position of a first object within an image represented by the received image data by analyzing the received image data;
        an extracting process of extracting object image data representing the first object from the image data received in the image data receiving process based on the position information when:
            the image data received in the image data receiving process represents an image in which the first object is arranged;
            a size of the image is a first size; and
            the size selected in the size selection receiving process is a second size which is different from the first size;
        a generating process of generating printing data causing a printer, which is connected with the information processing apparatus through the communication interface, to print an image in which the first object represented by the object image data extracted in the extracting process is arranged on the sheet having the second size;
        an outputting process of outputting the printing data generated in the generating process, the printing data being transmitted to the printer through the communication interface;
        a display controlling process of displaying a process selection screen on a display interface of the information processing apparatus, a non-extract printing process and an extract printing process, which includes a first extract printing process, being selectable, from among a plurality of printing processes, on the process selection screen, the extract printing process being a process of extracting a part of an image and printing the extracted part of the image;
        when the input interface receives the user operation, on the process selection screen, to select the extract printing process, in the size selection screen displaying process, and the first extract printing process has been selected, displaying the size selection screen on which a size of a sheet used for printing is selectable only from among sheet sizes having a sheet width equal to or greater than a particular width; and
        when the input interface receives the user operation, on the process selection screen, to select the non-extract printing process, in the size selection screen displaying process, displaying the size selection screen on which a size of a sheet used for printing is selectable from among sheet sizes having a sheet width both less than and equal to or greater than the particular width.

10. A method of controlling an information processing apparatus having a communication interface, an input interface configured to receive a user operation, an application being installed in the information processing apparatus, the application being configured to output image data, the method comprising:
- displaying a size selection screen on which a size of a sheet used for printing is selectable from among a plurality of sizes;
- receiving selection of a size of the sheet used for printing on the size selection screen through the input interface;
- receiving image data which is output by the application;
- identifying position information regarding a position of a first object within an image represented by the received image data by analyzing the received image data;
- extracting object image data representing the first object from the image data as received based on the position information when:
  - the received image data represents an image in which the first object is arranged;
  - a size of the image is a first size; and
  - the size selected is a second size which is different from the first size;
- generating printing data causing a printer, which is connected with the information processing apparatus through the communication interface, to print an image in which the first object represented by the object image data as extracted is arranged on the sheet having the second size;
- outputting the generated printing data which is to be transmitted to the printer through the communication interface;
- displaying a process selection screen on a display interface of the information processing apparatus, a non-extract printing process and an extract printing process being selectable, from among a plurality of printing processes, on the process selection screen, the extract printing process being a process of extracting a part of an image and printing the extracted part of the image; and
- responsive to the input interface receiving the user operation, on the process selection screen, to select the extract printing process, in the size selection screen displaying process, displaying the size selection screen on which a size of a sheet used for printing is selectable only from among sheet sizes having a sheet width equal to or greater than a particular width among the plurality of sizes, wherein the sheet sizes selectable in the non-extract printing process are from among sheet sizes having a sheet width both less than and equal to or greater than the particular width.

* * * * *